United States Patent
Collins et al.

(10) Patent No.: US 8,950,672 B2
(45) Date of Patent: Feb. 10, 2015

(54) METHODS AND APPARATUS FOR CONTROL OF AN IMAGING SCANNER

(75) Inventors: Donald Collins, Buford, GA (US); John Crooks, Duluth, GA (US)

(73) Assignee: NCR Corporation, Duluth, GA (US)

( * ) Notice: Subject to any disclaimer, the term of this patent is extended or adjusted under 35 U.S.C. 154(b) by 12 days.

(21) Appl. No.: 13/247,451

(22) Filed: Sep. 28, 2011

(65) Prior Publication Data
US 2013/0075472 A1    Mar. 28, 2013

(51) Int. Cl.
*G06K 7/00* (2006.01)
*G06K 7/10* (2006.01)

(52) U.S. Cl.
CPC ............ *G06K 7/109* (2013.01); *G06K 7/10554* (2013.01); *G06K 7/10722* (2013.01); *G06K 7/1096* (2013.01)
USPC ........................................................ 235/440

(58) Field of Classification Search
CPC ................ G06K 7/10881; G06K 7/14; G06K 2207/1011; G06K 7/10851; G06K 2207/1012; G06K 7/109; G06K 7/10722; G06K 7/10554; G06K 7/10732; G06K 7/10861; G06K 7/10871; G06K 2207/1018; G06K 7/10584
USPC ........................................................ 235/440
See application file for complete search history.

(56) References Cited

U.S. PATENT DOCUMENTS

| | | | | |
|---|---|---|---|---|
| 5,304,786 A | * | 4/1994 | Pavlidis et al. | 235/462.07 |
| 5,825,006 A | * | 10/1998 | Longacre et al. | 235/462.27 |
| 6,637,655 B1 | * | 10/2003 | Hudrick et al. | 235/462.14 |
| 7,494,063 B2 | * | 2/2009 | Kotlarsky et al. | 235/462.27 |
| 7,527,203 B2 | * | 5/2009 | Bremer et al. | 235/462.07 |
| 2006/0180670 A1 | * | 8/2006 | Acosta et al. | 235/462.31 |
| 2011/0269543 A1 | * | 11/2011 | Johnson | 463/37 |
| 2011/0290889 A1 | * | 12/2011 | Tamburrini et al. | 235/470 |
| 2012/0007738 A1 | * | 1/2012 | Barkan et al. | 340/540 |

* cited by examiner

*Primary Examiner* — Thien M Le
*Assistant Examiner* — Tae Kim
(74) *Attorney, Agent, or Firm* — Peter H. Priest; Joseph P. Merhle

(57) ABSTRACT

Techniques are addressed for control of an imaging scanner to supplement a laser scan line based scanner. Upon detection of the imaging scanner in a docked position, a lighting arrangement is automatically lit and the imager is triggered. Upon detection of the imaging scanner not in the docked position, the imaging scanner is not automatically lit, but rather is only lit upon manual trigger activation. As an alternative to the automatic lighting when docked, the lighting may be cued upon the imaging scanner being docked and an analysis of laser scan video detecting a barcode like object or upon detecting a barcode like object in the image field of the imaging scanner.

11 Claims, 6 Drawing Sheets

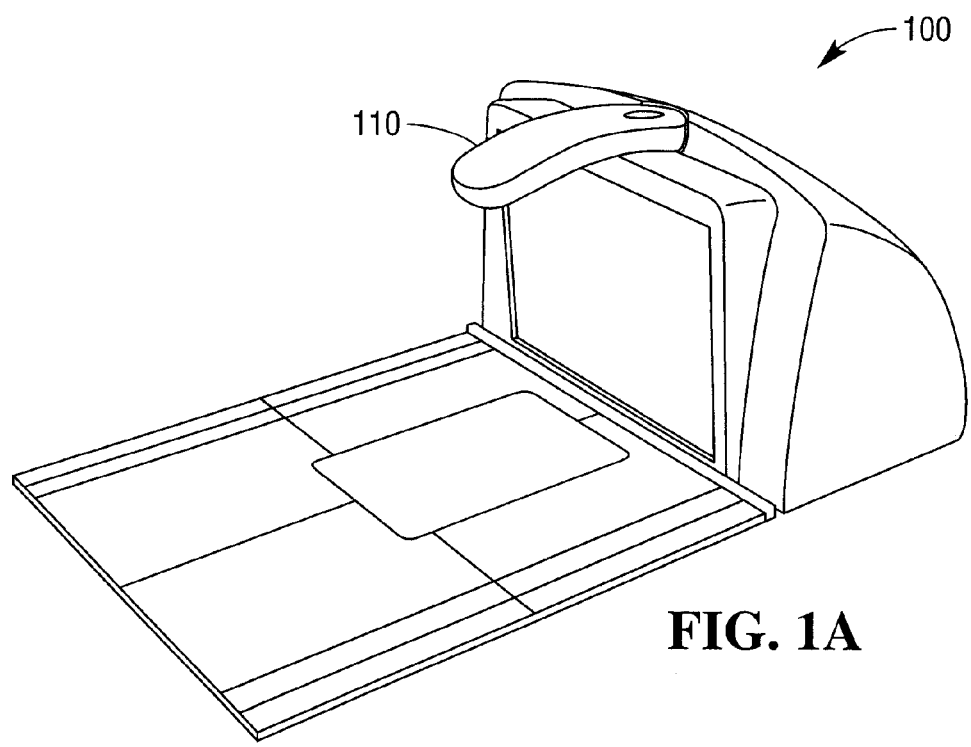
FIG. 1A
FIG. 1B
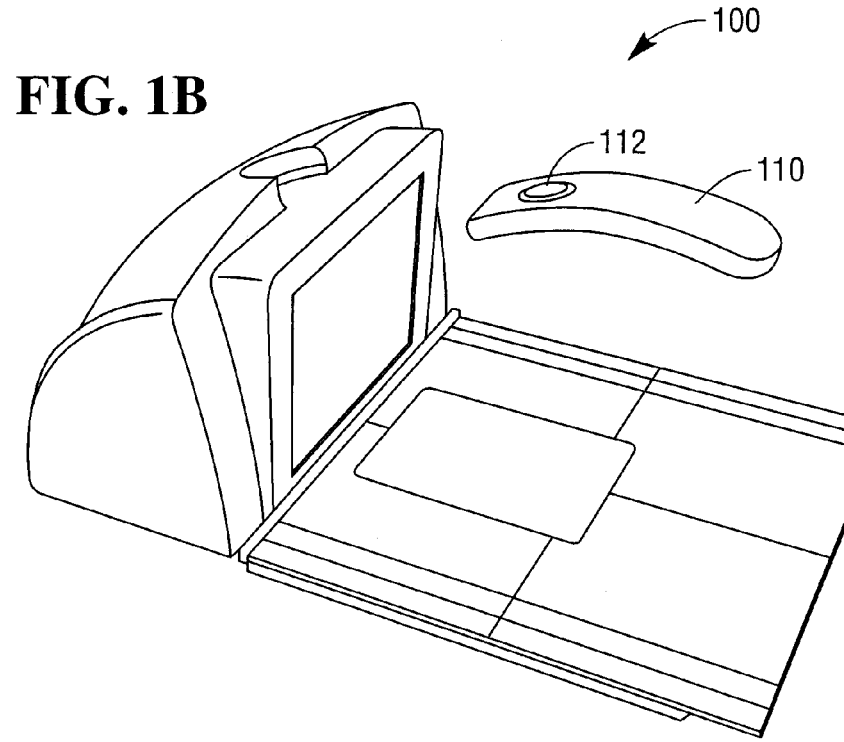

METHODS AND APPARATUS FOR CONTROL OF AN IMAGING SCANNER

FIELD OF THE INVENTION

The present invention relates generally to improvements in barcode scanning, and more particularly to improved methods and apparatus for providing an imaging scanner to supplement a dual aperture or other barcode scanner which is built into a checkout counter.

BACKGROUND OF THE INVENTION

Over the past approximately twenty years, dual aperture scanners which are built into a checkout stand and produce both vertical and horizontal scan patterns of laser scan lines to effectively scan barcodes have become ubiquitous. See, for example, U.S. Pat. Nos. 5,229,588 and 7,611,055, which are incorporated by reference herein in their entirety, for further details of two examples of such optical scanners. Tethered supplemental barcode scanners are also well known for use in scanning items not typically presented to the dual aperture scanner, such as large and bulky items left in a customer's cart, for example. The laser scan lines of such barcode reading approaches are highly efficient at reading typical UPC codes and the like. Recently, however, the use of two dimensional (2D) barcodes has increased, such as those found on driver's licenses which are used for identification, such as when purchasing alcoholic beverages or cigarettes or when cashing a check or using a credit card. Also, matrix codes such as quick response (QR) codes and the like with cell phones are being more widely adopted. Laser scanners may not have the ability to read 2D barcodes and other specialized symbologies. Further, customers having cell phones with the proper application or applications running thereon scan barcodes of customer loyalty cards and rather than carry around a key ring or wallet full of such cards, can simply display the relevant barcode on their cell phone display. As a result, a need has arisen to supplement the optical arrangements based on laser scan lines with imaging readers to obtain images and read these more complex codes as well as others.

SUMMARY OF THE INVENTION

Among its several aspects, the present invention recognizes that a supplemental imaging scanner if removable and portable can advantageously serve the dual purpose of reading 2D and QR codes when docked and regular barcodes on bulky items and the like when not docked. The illumination employed by imaging scanners may be annoying or irritating to customers and checkout personnel if not managed properly. Such illumination may also interfere with laser scanning. Techniques for addressing such problems are discussed herein. To insure proper docking, an indicator light or lights may be suitably employed as discussed further herein.

In one embodiment, a lighting arrangement, such as a series of LEDs, is advantageously employed to provide diffuse light directed away from the scanner glass when the imager is docked. When the imager is removed from the dock, the series of LEDs is not lit except when triggered by a trigger mechanism.

In another embodiment, video from the laser scanning arrangement is analyzed to detect a barcode like object in the field of view of the imager when the imager is docked and the imager is automatically triggered.

A more complete understanding of the present invention, as well as further features and advantages of the invention, will be apparent from the following Detailed Description and the accompanying drawings.

BRIEF DESCRIPTION OF THE DRAWINGS

FIG. 1A shows a first embodiment of a dual aperture scanner with a removable wireless imaging scanner in its docked position in accordance with the present invention;

FIG. 1B shows the dual aperture scanner of FIG. 1A with the imaging scanner removed from its docked position;

DETAILED DESCRIPTION

FIGS. 1A and 1B illustrate a first embodiment of a dual aperture scanner 100 employing a wireless imaging scanner 110 in accordance with the present invention. In FIG. 1A, the imaging scanner 110 is shown in a docked position. In this position, a two dimensional (2D) barcode, a quick response (QR) code or the like is presented in an active imaging field and read by the imaging scanner 110. In FIG. 1B, the imaging scanner is shown removed from the docked position. Upon removal from the docked position, the imaging scanner 110 may be suitably employed to read barcodes upon an operator's pressing a trigger 112. Read data is wirelessly transmitted to the scanner 100. Thus, the imaging scanner 110 advantageously replaces the prior tethered barcode scanner for reading items not presented to the dual aperture scanner 100 and also provides supplemental image based reading for more complex codes, such as 2D and QR codes.

Figure 2:
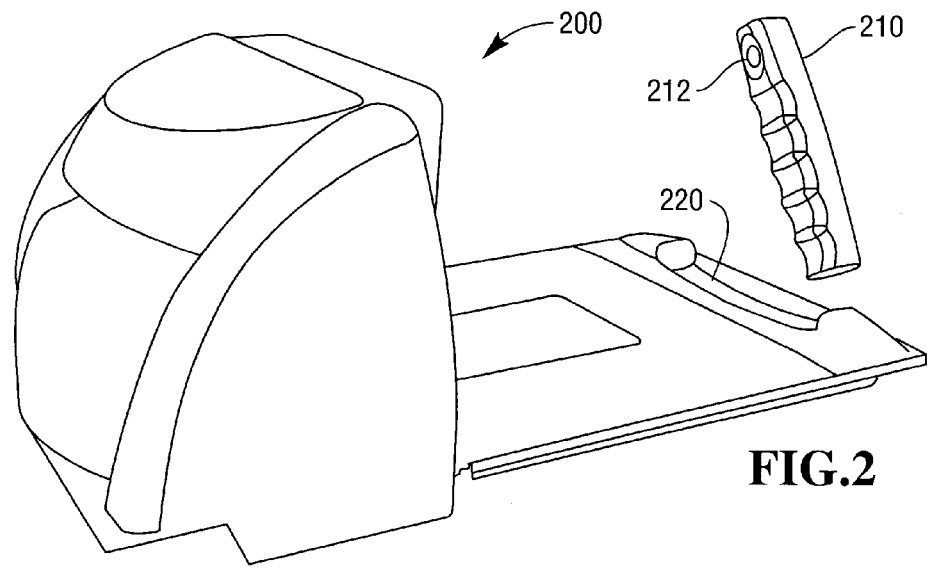
FIG. 2 shows a second embodiment of a dual aperture scanner with a different embodiment of a removable wireless imaging scanner in accordance with the present invention.

FIG. 2 illustrates a second embodiment of a dual aperture scanner 200 employing a wireless imaging scanner 210. In FIG. 2, the imaging scanner 210 snaps or fits into a cradle 220 when stored in its docked position.

Figure 3:
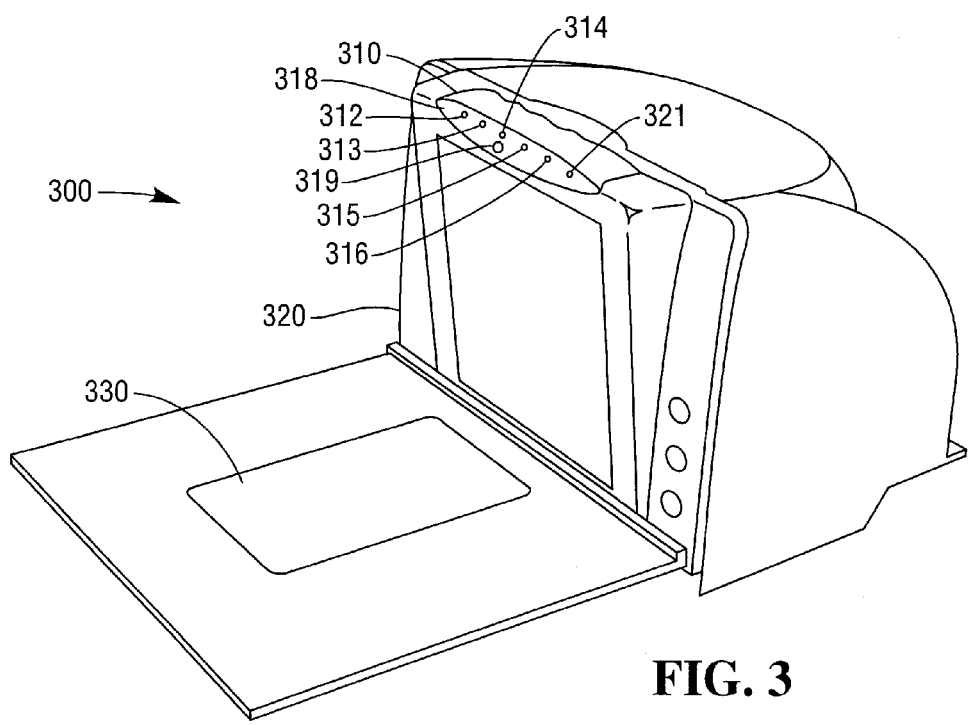
FIG. 3 shows a third embodiment of a dual aperture scanner with a further embodiment of a removable wireless imaging scanner in accordance with the present invention.

FIG. 3 illustrates a third embodiment of a dual operator scanner 300 employing a wireless imaging scanner 310. In FIG. 3, the imaging scanner 310 is shown snapped into its cradle (not shown). The imaging scanner 310 includes a series of LEDs 312, 313, 314, 315, and 316. As seen in FIG. 3, the plurality of LEDs 312, 313, 314, 315, and 316 mounted on bezel 318 of the imaging scanner 310. The LEDs 312-316 provide a source of bright diffuse lighting to light two dimensional (2D) barcodes that are brought into the scanning position for the CCD scanner or camera 319 of docked imaging scanner 310. An indicator light or lights 321 show the user when the imaging scanner 310 is properly docked, as well as when it is not. For example, a green LED is lit when docked and not lit when not docked, or a green LED is lit when docked and a red LED flashing when not docked. Such a flashing LED draws the attention of a user both to dock the imaging scanner 310 properly and to not forget that the imaging scanner 310 requires docking. Any handheld portable item can be misplaced in a busy environment like that of a high volume retail or grocery store.

In FIG. 3, bezel 318 is preferably angled so that light from LEDs 312-316 is angled away from the scanner glass 320 and 330 so as not to cause optical interference with the laser barcode scanning. In one embodiment, when the imaging scanner is docked, the LEDs 312-316 are on and upon removal they are off until triggered on by a trigger switch (not seen in FIG. 3), such as switch 112 of FIG. 1B or switch 212 of FIG. 2, for example. The trigger switch also causes the camera or other imaging device to optically image a barcode, 2D barcode, QR code or the like presented in the scanning position.

In an alternative embodiment as described further below in connection with FIGS. 4-6, the LEDs 312-316 may be normally off when the imaging scanner 310 is docked and are only turned on when a 2D barcode or the like is detected as being presented in the scanning position for the imaging scanner 310.

Figure 4:
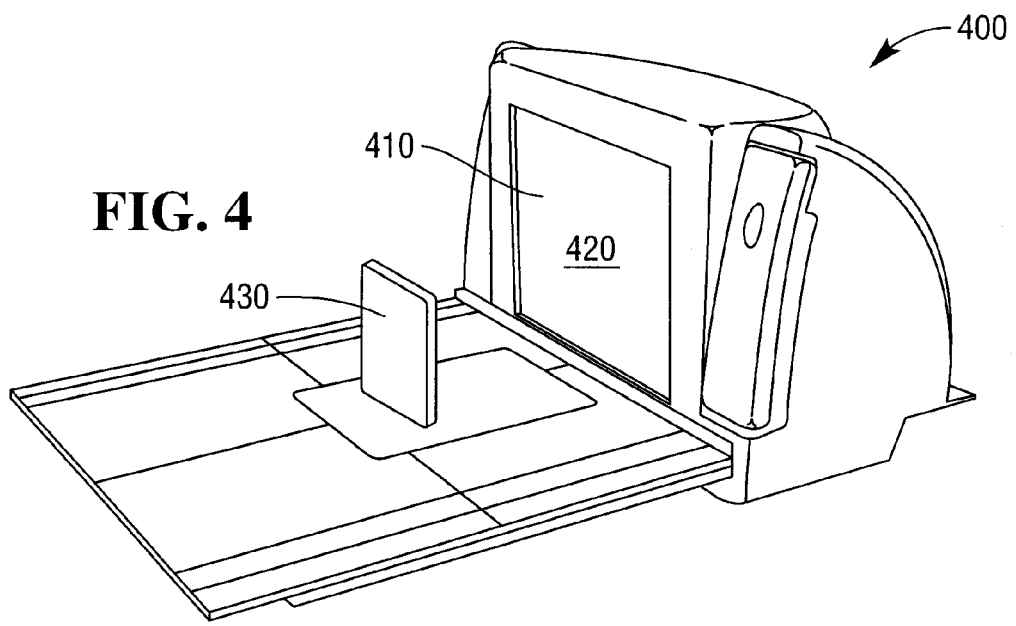
FIG. 4 shows a fourth embodiment of a dual aperture scanner employing an internal imaging scanner in accordance with the present invention.

FIG. 4 illustrates a fourth embodiment of a dual aperture scanner 400 employing an internally integrated imaging scanner 410 to scan a display of a cellphone 430.

Figure 5:
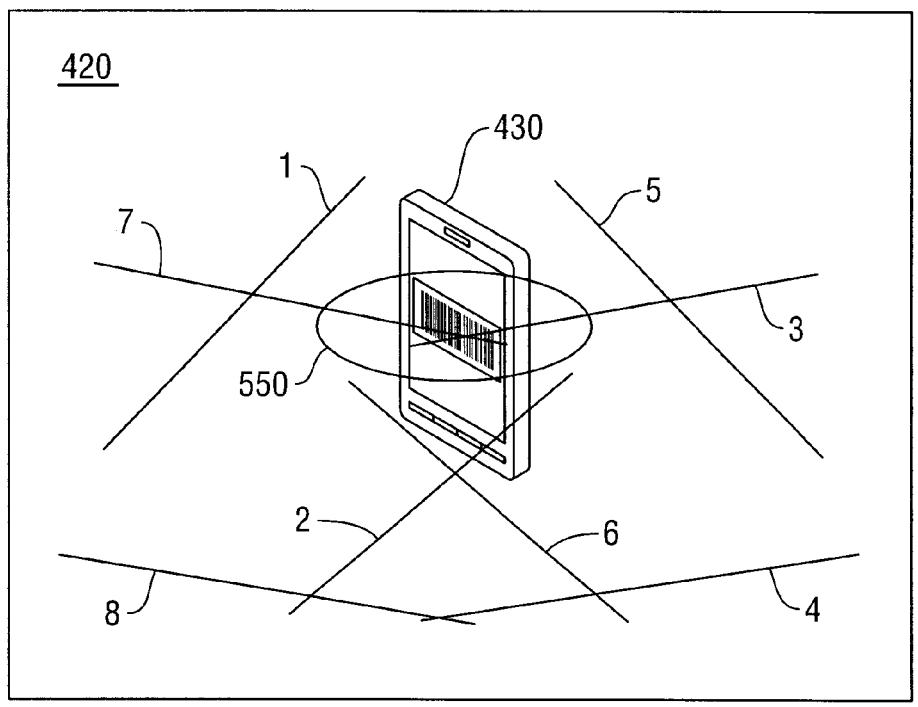
FIG. 5 illustrates how a two dimensional (2D) barcode, a quick response (QR) code or the like is located in the active imaging field in accordance with the present invention.

FIG. 5 illustrates laser scan lines 1-8 in the field of view of vertical scan window 420 of scanner 400 of FIG. 4. An active area for imager 410 that includes a barcode displayed on the display of cellphone 430 is represented by an oval 550. In many typical laser scanners, an optical detector sees reflected laser signal from each scan line, such as scan lines 1-8 of FIG. 5, as a continuous video signal.

Figure 6:
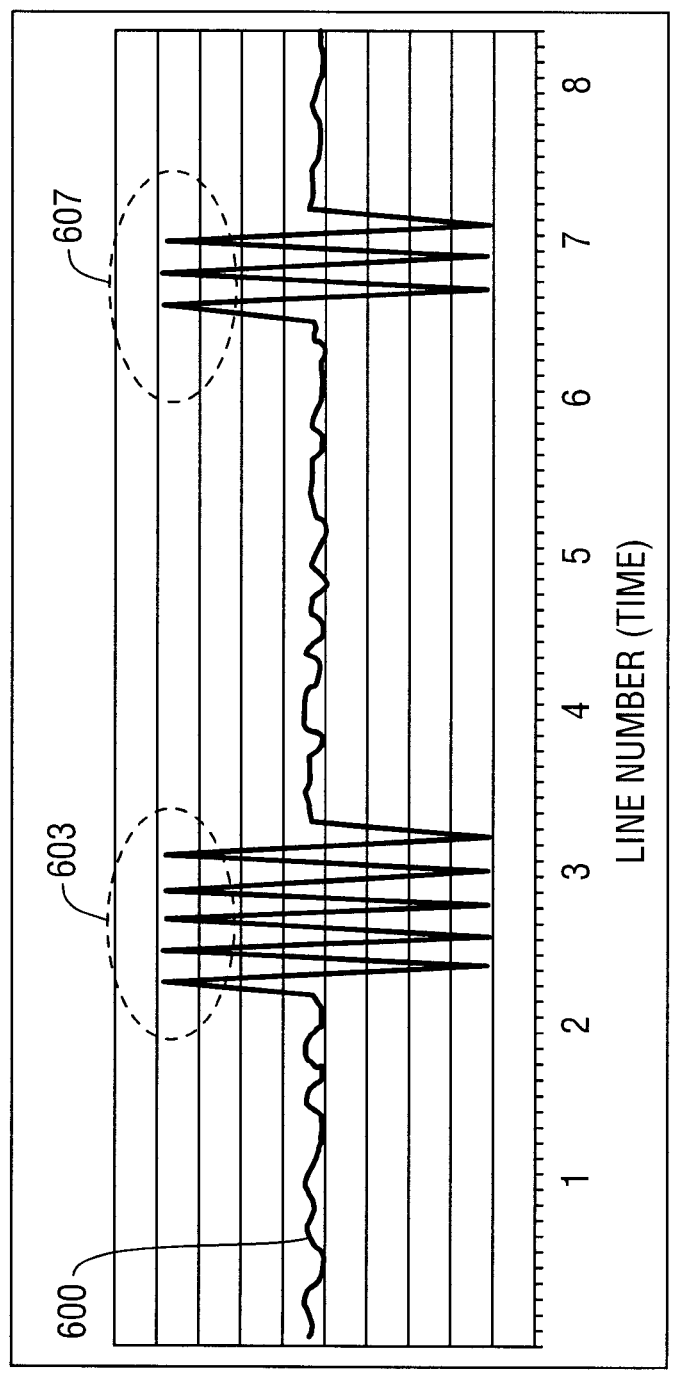
FIG. 6 illustrates an analysis of a video signal for detecting that a barcode is located in the active imaging field in accordance with the present invention.

FIG. 6 shows illustrative video signal 600 for laser lines 1-8 of FIG. 5. In the simplified illustration of FIG. 6, this video signal from each scan line appears end-to-end with signal from adjacent scan lines. The video signal is filtered and converted to digital data for a central processing unit (CPU) to process into a barcode. Barcodes, and barcode-like features, are clearly visible to the CPU in the processed video signal. In FIG. 6, the transitions 603 and 607 for scan lines 3 and 7 are indicative of a barcode or other code. The end of scan line 3 and the beginning of scan line 7 coincide with the center of active imaging field 550. Because the CPU knows the motor position corresponding to the video data, the CPU can determine where these barcode features are positioned within the scan pattern. If the barcode position within the scan pattern indicates that the barcode is within the imager's active area 550 the CPU can turn on the imager lighting and trigger the imager to start looking for codes.

Figure 7:
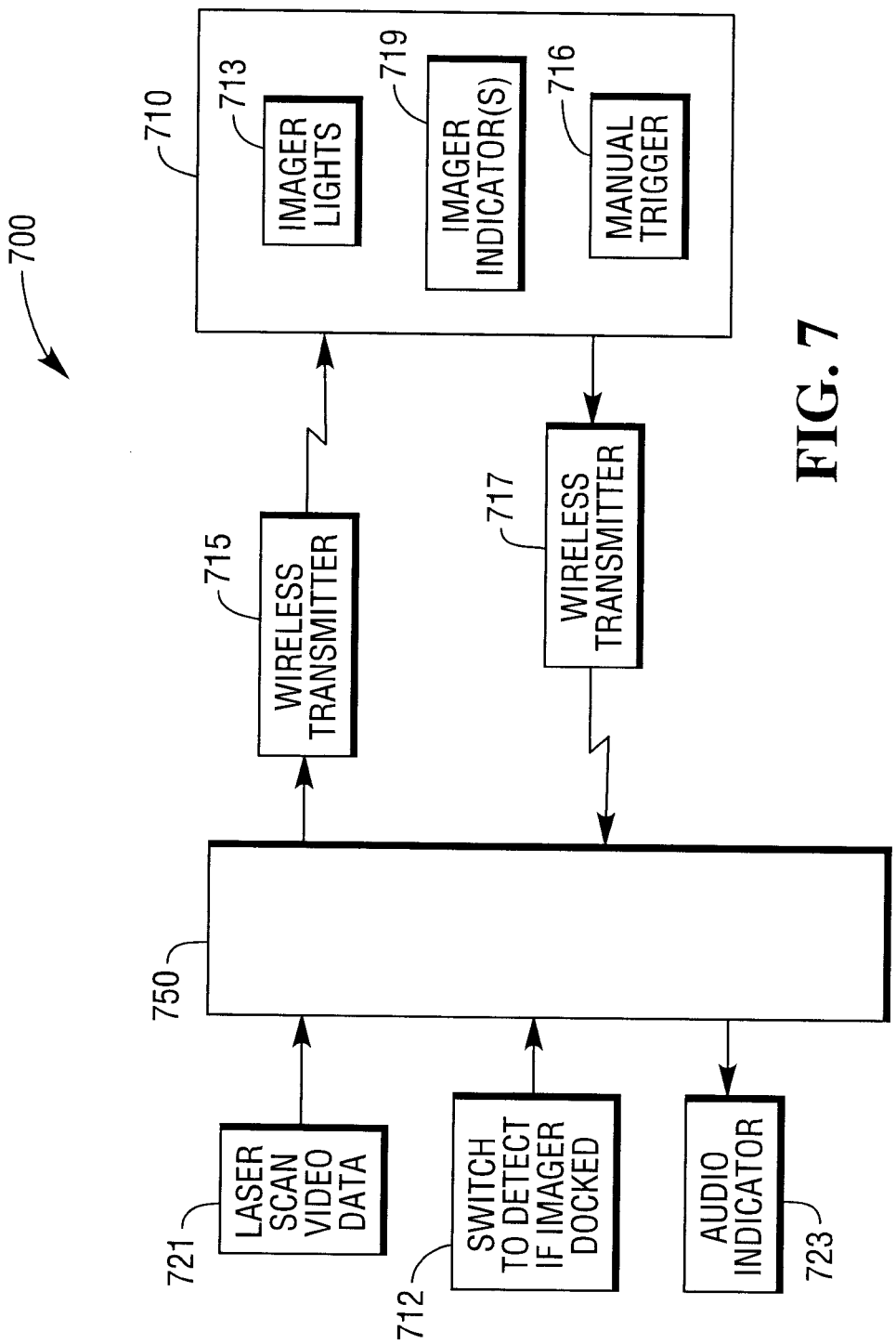
FIG. 7 shows control circuitry in accordance with the present invention.

FIG. 7 illustrates an exemplary control circuit 700 in accordance with the present invention. In FIG. 7, a processor 750 detects when a removable imager 710, such as one of the imagers 110, 210, or 310, is docked and when it is not docked. For example, processor 750 detects that switch 712 is closed when the imager 710 is docked and that switch 712 is open when the imager 710 is removed from its docking station. In one embodiment, the processor 750 drives imager lights 713, such as LEDs 312-316 of FIG. 3, which preferably provide diffuse bright lighting which faces away from the scanner glass and which is outside the scan volume of the vertical and horizontal scan faces. As shown in FIG. 7, processor 750 drives a wireless transmitter 715 to transmit control signals to imager 710 to control the imager lights 713.

In this embodiment, upon detecting removal of the imager 710 from the docking position, the imager lights 713 are turned off and then activated only upon operation of a trigger, such as manual trigger 716, for example, the imager 711 then acquires an image of a barcode or other code, such as a 2D, QR code or the like, and the image data is wirelessly transmitted by a wireless transmitter 717 driven by imager 710 to the processor 750. Upon return of the imager 710 to the docking position, the imager lights 713 are turned back on. As addressed above, an imager indicator or indicators 719, such as a green LED, a flashing red LED or a combination thereof may be driven to visually indicate when the imager 710 is docked and when it is not docked. While FIG. 7 illustrates an arrangement in which the imager 710 sharing a common processor 750 with the dual aperture scanner, it will be recognized that both the imager 710 and the dual aperture scanner may have their own central processing units.

In a first alternative embodiment, laser scan video data 721 is analyzed by the processor 750 to look for barcode-like objects anywhere in the laser field of view. If the processor 750 detects something, it enables or otherwise triggers the imager 710 to turn on the imager lights 713 and start looking for barcodes or other codes.

In a second alternative embodiment laser scan video data 721 is analyzed by the processor 750 to look for barcode-like objects within the imager's field of view. If the processor 750 detects something, it enables or otherwise triggers the imager 710 to turn on the imager lights 713 and start looking for barcodes or other codes. As one example, the processor 750 may be programmed to recognize a series of transitions as belonging to a possible 2D barcode, a QR code or the like. Alternatively, for reading codes on a cell phone presented by the checkout person, transitions combined with the presentation lasting longer than a predetermined time may be detected. In either case, upon successful reading of a code by the imager 710, an aural indicator 723 may be driven to produce a beep or other aural cue that the read was successful.

In either of the first and second alternative embodiments, it will be recognized that where a removable handheld imager 710 is employed, as opposed to an internal imager as discussed above in connection with FIG. 5, it will be advantageous to disable automatic laser based triggering when the imager 710 is detected as removed from its dock.

Figure 8:
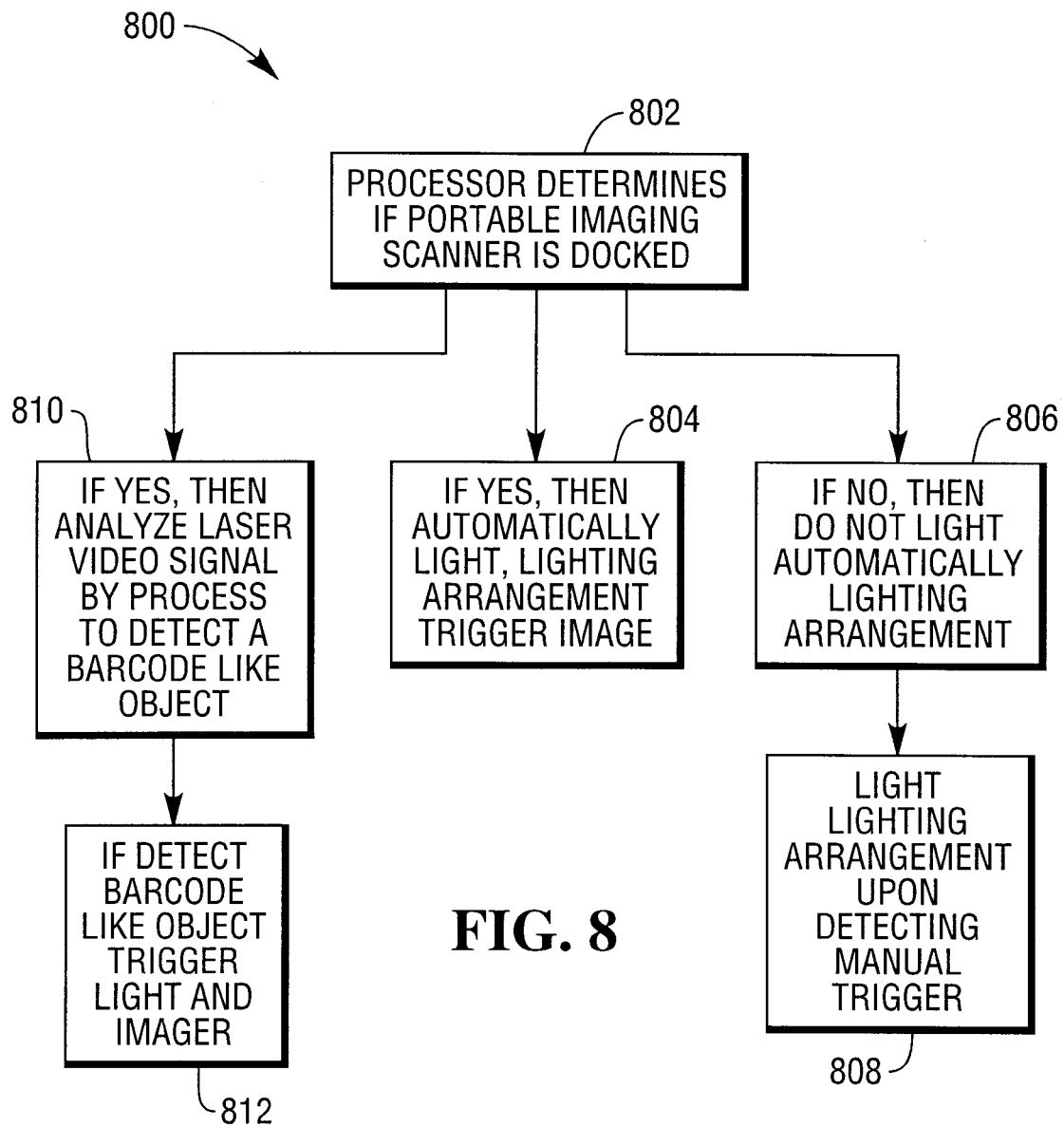
FIG. 8 illustrates a process of imaging scanner control in accordance with the present invention.

FIG. 8 illustrates a process 800 in accordance with an embodiment of the invention. In step 802, a processor determines if a portable imaging scanner is in its docked position or not. If in step 802, the imaging scanner is docked, then a lighting arrangement is lit in step 804. If in step 802, the imaging scanner is not docked, then the lighting arrangement is not lit in step 806. If in step 806, a manual trigger is activated, then the lighting arrangement is lit in step 808. As an alternative to step 804, in step 808, a laser video signal is analyzed by a processor to detect a barcode like object. In step 810, if a barcode like object was detected, then the lighting arrangement is lit and the imager is automatically triggered in step 812.

While the present invention is disclosed in the context of a presently preferred embodiment, it will be recognized that a wide variety of implementations may be employed by persons of ordinary skill in the art consistent with the above discussion and the claims which follow below. For example, while various handheld imaging scanners are illustrated, it will be understood that other imaging scanners and mounting arrangements may be devised consistent with the teachings herein. Further, while exemplary sensing and lighting arrangements are addressed herein, it will be recognized that other approaches may be adapted to suit the particular context and environment in which the invention is employed.

We claim:

1. A dual purpose imaging scanner apparatus operating to obtain images and read complex codes in a docked position in a dual aperture scanner, and to read regular barcodes when not in the docked position comprising:
   an imaging scanner;
   a detector to detect that the imaging scanner is in the docked position in the dual aperture scanner;
   a lighting arrangement mounted on the imaging scanner to light an object placed in an active imaging field for the imaging scanner to support operation of the imaging scanner to obtain images of the object, wherein the lighting arrangement comprises a plurality of LEDs mounted in an angled bezel of the imaging scanner, the angle of the angled bezel serving to direct light from the plurality of LEDs away from faces of a dual aperture scanner when the imaging scanner is docked; and
   a control processor to automatically light the lighting arrangement when the imaging scanner is in the docked position and to not automatically light the lighting arrangement when the imaging scanner is not in the docked position.

2. The apparatus of claim 1 further comprising:
   a laser barcode scanner in the dual aperture scanner for generating scan lines and producing video signal therefrom, and wherein the control processor analyzes the video signal to detect barcode like objects in the active image field for the imaging scanner and automatically light the lighting arrangement only when the imaging scanner is in the docked position and a bar code like object is detected in said active image field.

3. The apparatus of claim 2 wherein when the imaging scanner is not in the docked position, the imaging scanner wirelessly transmits read data to the laser barcode scanner.

4. The apparatus of claim 2 wherein the imaging scanner fits in a cradle in the laser barcode scanner when in the docked position.

5. The apparatus of claim 1 wherein the dual aperture scanner is a laser scanner reading barcodes on items presented to a field of view of a horizontal and a field of view of a vertical scan face; and wherein the complex codes comprise two dimensional codes and matrix based codes, and the imaging scanner supplements the reading ability of the dual aperture scanner by performing image based reading of the two dimensional barcodes and the matrix based codes.

6. The apparatus of claim 5 wherein the control processor analyzes transitions from video signal for plural laser scan lines to determine if a barcode like object is located in an active image field for the imaging scanner.

7. The apparatus of claim 6 wherein the control processor automatically drives the lighting arrangement and triggers the imaging scanner to attempt to read the barcode like object located in the active image field.

8. The apparatus of claim 1 wherein the imaging scanner further comprises a manual trigger which is active when the imaging scanner is not in the docked position.

9. The apparatus of claim 1 wherein the control processor is in the dual aperture scanner and drives a wireless transmitter to transmit control signals to the imaging scanner to control the lighting arrangement.

10. The apparatus of claim 1 wherein the imaging scanner employs a wireless transmitter to communicate image data to the control processor.

11. The apparatus of claim 1 wherein the imaging scanner and the dual aperture scanner share the control processor.

* * * * *